United States Patent [19]
Hwang

[11] Patent Number: 5,342,025
[45] Date of Patent: Aug. 30, 1994

[54] MAGNETIC CONTROL-TYPE FLOW CONTROL VALVE

[76] Inventor: Shao-Keh Hwang, No. 338, Lung-Nan Rd., Chung-Liao Hsiang, Nantou Hsien, Taiwan

[21] Appl. No.: 177,584

[22] Filed: Jan. 5, 1994

[51] Int. Cl.⁵ ............................................. F16K 31/08
[52] U.S. Cl. ..................................... 251/65; 251/208; 251/345; 137/556
[58] Field of Search ........................ 251/65, 345, 208; 137/556, 601

[56] References Cited

U.S. PATENT DOCUMENTS

| | | | |
|---|---|---|---|
| 3,880,401 | 4/1975 | Wiltse | 137/556 |
| 4,294,286 | 10/1981 | Ohumi | 251/65 |
| 5,025,832 | 6/1991 | Taylor | 251/208 |
| 5,114,412 | 6/1992 | Flinchbaugh | 251/65 |
| 5,213,307 | 6/1993 | Perrillat-Amede | 251/65 |

Primary Examiner—A. Michael Chambers
Attorney, Agent, or Firm—Merchant, Gould, Smith, Edell, Welter & Schmidt

[57] ABSTRACT

A magnetic control-type flow control valve includes a driven magnet ring disposed rotatably in a metal tube unit, a rotatable circular valve piece connected to a bottom end of the driven magnet ring and formed with first openings, a stationary circular valve piece secured in the metal tube unit and in tight contact with the rotatable valve piece, and a driving magnet ring sleeved on the metal tube unit and rotatable to rotate the driven magnet ring therewith so as to rotate correspondingly the rotatable valve piece in order to cover selectively second openings formed in the stationary valve piece.

7 Claims, 11 Drawing Sheets

MAGNETIC CONTROL-TYPE FLOW CONTROL VALVE

BACKGROUND OF THE INVENTION

1. Field of the Invention

The invention relates to a flow control valve, more particularly to a magnetic control-type flow control valve which can prevent effectively the occurrence of leakage.

2. Description of the Related Art

Valves are used to control the amount of fluid, such as water, oil or gas, which pass therethrough. In a conventional valve, a handle or lever is operated so as to rotate correspondingly a valve piece of the valve, thereby controlling the flow of fluid through an outlet of the latter.

Most conventional valves tend to suffer from leakage. In order to overcome this problem, a sealing ring is usually provided on the valve piece. Even with the incorporation of the sealing ring, leakage can still occur due to the relatively short useful life of the latter.

SUMMARY OF THE INVENTION

Therefore, the objective of the present invention is to provide a magnetic control-type flow control valve which can prevent effectively the occurrence of leakage.

Accordingly, the magnetic control-type flow control valve of the present invention comprises:

- a metal tube unit with a top end portion, a bottom end portion and an intermediate portion between the top and bottom end portions, the intermediate portion having an outer wall surface that is formed with an annular recess;
- a driven magnet ring disposed rotatably in the intermediate portion of the metal tube unit, the driven magnet ring having a bottom end and an outer peripheral wall with a first polarity;
- a rotatable circular valve piece disposed in the intermediate portion of the metal tube unit and connected to the bottom end of the driven magnet ring, the rotatable valve piece having a bottom surface and being formed with a pair of diametrically opposite first openings;
- a stationary circular valve piece secured in the bottom end portion of the metal tube unit, the stationary valve piece having a top surface in tight contact with the bottom surface of the rotatable valve piece and being formed with a pair of diametrically opposite second openings; and
- a driving magnet ring sleeved on the outer wall surface of the intermediate portion of the metal tube unit in the annular recess, the driving magnet ring having an inner peripheral wall with a second polarity opposite to the first polarity, the driving magnet ring being rotatable to rotate the driven magnet ring therewith so as to rotate correspondingly the rotatable valve piece relative to the stationary valve piece between a first position, wherein the first and second openings are aligned, and a second position, wherein the rotatable valve piece covers completely the second openings.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
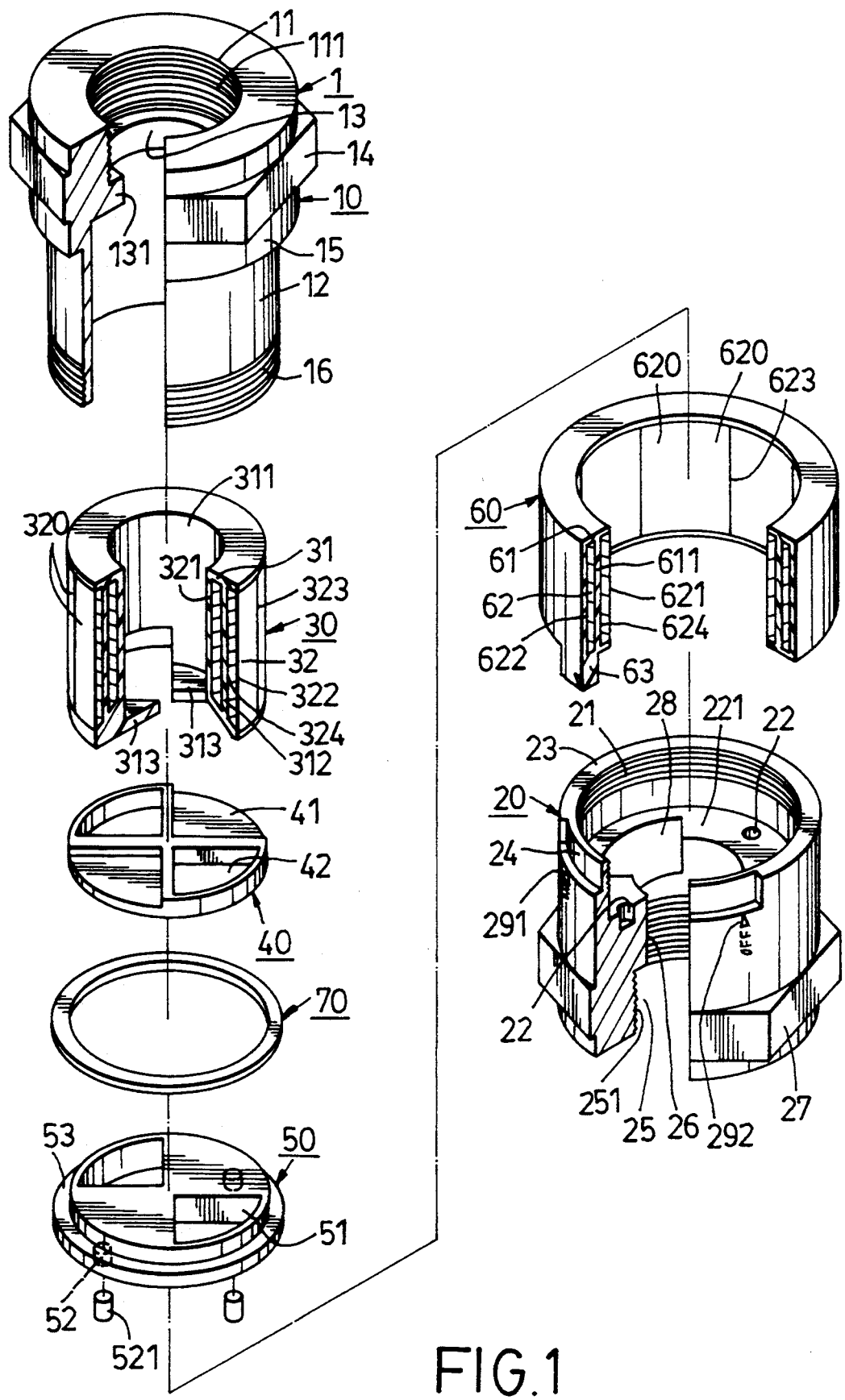
FIG. 1 is an exploded view of the preferred embodiment of a magnetic control-type flow control valve according to the present invention.

Referring to FIG. 1, the preferred embodiment of a magnetic control-type flow control valve according to the present invention is shown to comprise a metal tube unit 1, a driven magnet ring 30, a rotatable valve piece 40, a stationary valve piece 50 and a driving magnet ring 60.

Figure 3:
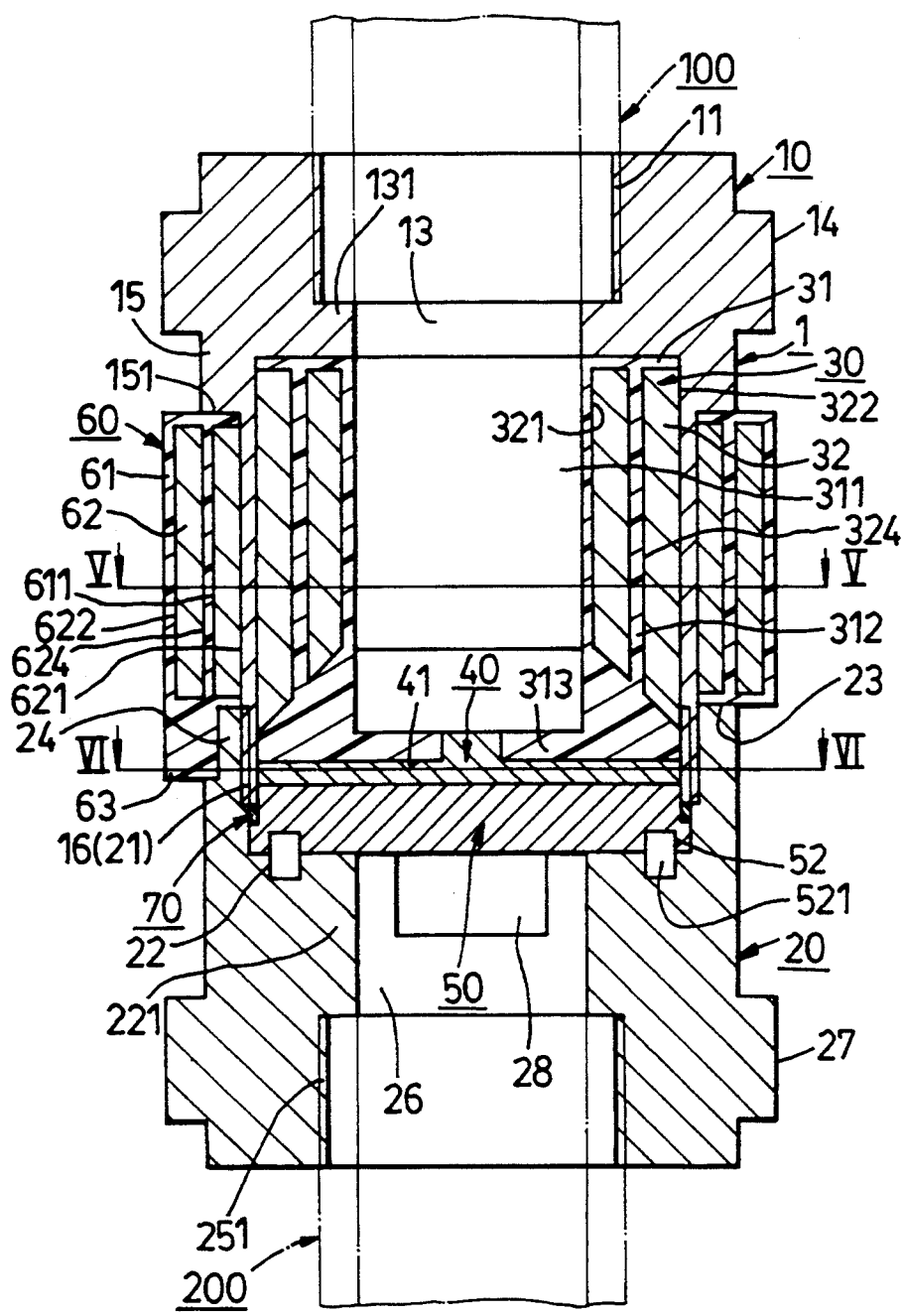
FIG. 3 is a sectional view of the preferred embodiment taken along line III—III in FIG. 2.
Figure 4:
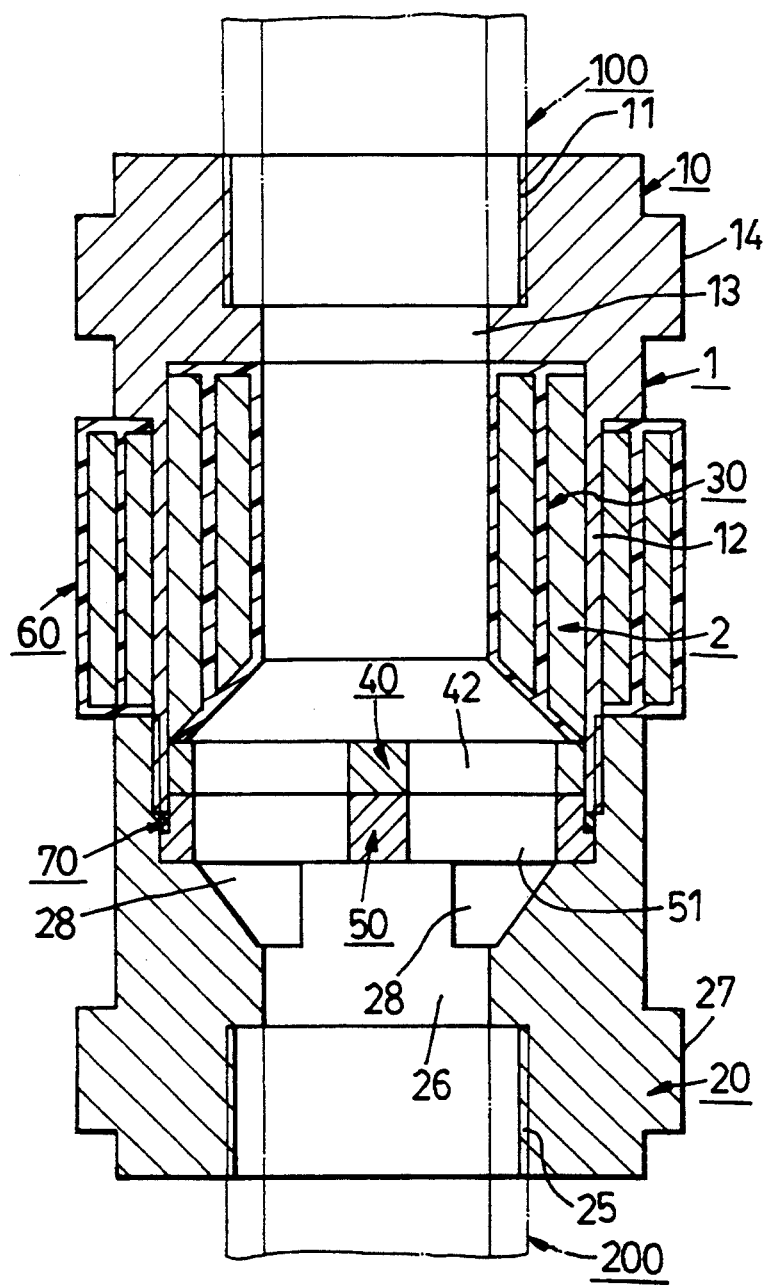
FIG. 4 is another sectional view of the preferred embodiment taken along line IV—IV in FIG. 2.

The metal tube unit 1 includes a tubular seat 10 and a mounting tube 20. The tubular seat 10 has an upper section 11 and a lower section 12 which respectively serve as a top end portion and an intermediate portion of the metal tube unit 1. The upper section 11 of the tubular seat 10 is formed with an internal thread 111 so as to permit connection with an inlet tube 100, as shown in FIG. 3. The tubular seat 10 has an annular inward flange 131 which defines a diameter reduced opening 13 between the upper and lower sections 11, 12. The tubular seat 10 is further provided with a hexagonal outward flange 14 on the outer surface of the upper section 11 and an annular outward flange 15 adjacent to the hexagonal outward flange 14. The lower section 12 of the tubular seat 10 has a distal end which is formed with an external thread 16.

The mounting tube 20 serves as a bottom end portion of the metal tube unit 1 and has an internally threaded upper end 21 and an annular inward flange 221 adjacent to the upper end 21. The inward flange 221 has a top surface which is formed with a pair of diametrically opposite blind pin holes 22 and further has an inner peripheral wall which defines a central hole 26 and which is formed with a pair of diametrically opposite fan-shaped passages 28. The upper end 21 of the mounting tube 20 engages threadedly the external thread 16 on the lower section 12 of the tubular seat 10 so as to form the metal tube unit 1. Adhesive may be applied when joining the tubular seat 10 and the mounting tube 20 together to prevent leakage effectively. The upper end 21 of the mounting tube 20 has a bearing face 23 which cooperates with the annular outward flange 15 on the upper section 11 of the tubular seat 10 and the outer wall surface of the lower section 12 of the tubular seat 10 so as to form an annular recess 151, as shown in FIG. 3. The upper end 21 of the mounting tube 20 is formed with a circumferentially extending limit groove 24. In this embodiment, the limit groove 24 has an angular width of 120°. The mounting tube 20 further has a hexagonal outward flange 27 and a lower end 25 which is formed with an internal thread 251 so as to permit connection with an outlet tube 200, as shown in FIG. 3.

The driven magnet ring 30 and the rotatable valve piece 40 are disposed rotatably in the lower section 12 confined by the tubular seat 10. The driven magnet ring 30 confines an axial through-hole 311 and includes a plastic shell 31 which encloses an annular magnet unit 32. The plastic shell 31 covers an inner peripheral wall 321, a top wall and a bottom wall of the annular magnet unit 32. The plastic shell 31, however, does not cover the outer peripheral wall 322 of the magnet unit 32. The plastic shell 31 has a bottom end which is formed with a pair of diametrically opposite insert projections 312. The insert projections 312 extend in a radial inward direction and are generally triangular in shape. The annular magnet unit 32 is formed by eight axially extending magnet pieces 320. The inner and outer peripheral walls 321, 322 of the magnet unit 32 have opposite polarities. Each of the magnet pieces 320 has a side wall 323 which is adjacent to another one of the magnet pieces 320 and which is formed with a longitudinally extending groove 324. Mounting ribs 312 fill in the grooves 324 when the plastic shell 31 is formed during an injection molding operation.

The rotatable valve piece 40 is a circular ceramic piece which has a top surface that is formed with a pair of diametrically opposite sectoral recesses 41 for receiving the insert projections 312 of the driven magnet ring 30 therein. The valve piece 40 is further formed with a pair of diametrically opposite sectoral openings 42, each of which being located between the recesses 41.

The stationary valve piece 50 is also formed as a circular ceramic piece and has a top surface which is in tight contact with the bottom surface of the rotatable valve piece 40. The valve piece 50 is formed with a pair of diametrically opposite fluid openings 51 which can be aligned selectively with the sectoral openings 42 and which are similar in shape with the latter. The fluid openings 51 permit communication between the sectoral openings 42 and the passages 28 in the inward flange 221 of the mounting tube 20. The valve piece 50 has a bottom surface which is formed with a pair of diametrically opposite blind pin holes 52 that are to be aligned with the pin holes 22 in the inward flange 221. Pins 521 extend into the aligned pin holes 22, 52 so as to mount immovably the valve piece 50 on the mounting tube 20. The top surface of the valve piece 50 is further formed with an annular peripheral groove 53. A sealing ring 70 is provided in the peripheral groove 53 and is in tight contact with a distal bearing face of the lower section 12 of the tubular seat 10.

The driving magnet ring 60 is sleeved on the metal tube unit 1 in the annular recess 151. The driving magnet ring 60 includes a plastic shell 61 which encloses an annular magnet unit 62. The plastic shell 61 covers an outer peripheral wall 622, a top wall and a bottom wall of the annular magnet unit 62. The plastic shell 61, however, does not cover the inner peripheral wall 621 of the magnet unit 62. The annular magnet unit 62 is formed by eight axially extending magnet pieces 620. The inner and outer peripheral walls 621, 622 of the magnet unit 62 have opposite polarities. The polarity of the inner peripheral wall 621 of the magnet unit 62 should be opposite to that of the outer peripheral wall 322 of the magnet unit 32 to permit attraction between the magnet units 32, 62. Each of the magnet pieces 620 has a side wall 623 which is adjacent to another one of the magnet pieces 620 and which is formed with a longitudinally extending groove 624. Mounting ribs 611 fill in the grooves 624 when the plastic shell 61 is formed during an injection molding operation. The plastic shell 61 further has a bottom end which is formed with a downwardly extending limit projection 63 that extends into the limit groove 24 in the mounting tube 20. In this embodiment, the limit projection 24 has an angular width of 30°.

Figure 2:
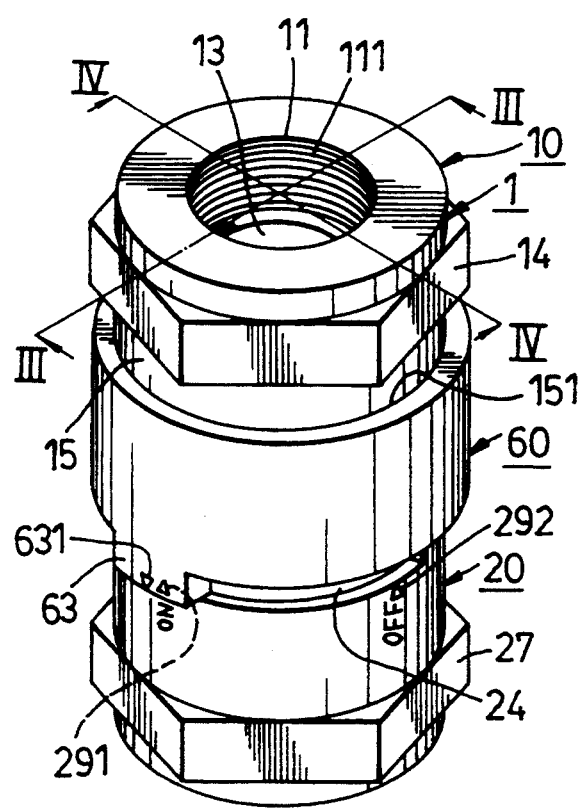
FIG. 2 is a perspective view illustrating the assembly of the preferred embodiment.

Assembly of the preferred embodiment is as follows: Referring to FIGS. 2 and 3, the insert projections 313 of the driven magnet ring 30 are initially inserted into the recesses 41 of the rotatable valve piece 40 before inserting the driven magnet ring 30 and the rotatable valve piece 40 in the lower section 12 of the tubular seat 10. When inserted, the outer peripheral wall 322 of the magnet unit 32 and the periphery of the rotatable valve piece 40 are preferably in sliding contact with the inner wall surface of the lower section 12 of the tubular seat 10. The driving magnet ring 60 is then sleeved on the tubular seat 10 such that the inner peripheral wall 621 of the magnet unit 62 is in sliding contact with the outer wall surface of the lower section 12 of the tubular seat 10. The sealing ring 70 is provided in the peripheral groove 53 of the stationary valve piece 50, and the stationary valve piece 50 is mounted on the inward flange 221 of the mounting tube 20 by means of the pins 521. The fluid openings 51 in the valve piece 50 are aligned with the passages 28 in the inward flange 221 at this stage. Finally, the upper end 21 of the mounting tube 20 is engaged threadedly to the external thread 16 on the lower section 12 of the tubular seat 10 so as to form the metal tube unit 1. The limit projection 63 of the driving magnet ring 60 extends into the limit groove 24 in the mounting tube 20 at this stage. Engagement between the tubular seat 10 and the mounting tube 20 can be accomplished with the use of a tool (not shown) which engages the outward flanges 14, 27 so as to permit relative rotation between the tubular seat 10 and the mounting tube 20. After the tubular seat 10 has been engaged tightly to the mounting tube 20, the distal bearing face of the lower section 12 of the tubular seat 10 presses tightly against the sealing ring 70 to press correspondingly the stationary valve piece 50 toward the inward flange 221 of the mounting tube 20, thereby preventing the occurrence of leakage.

Figure 5:
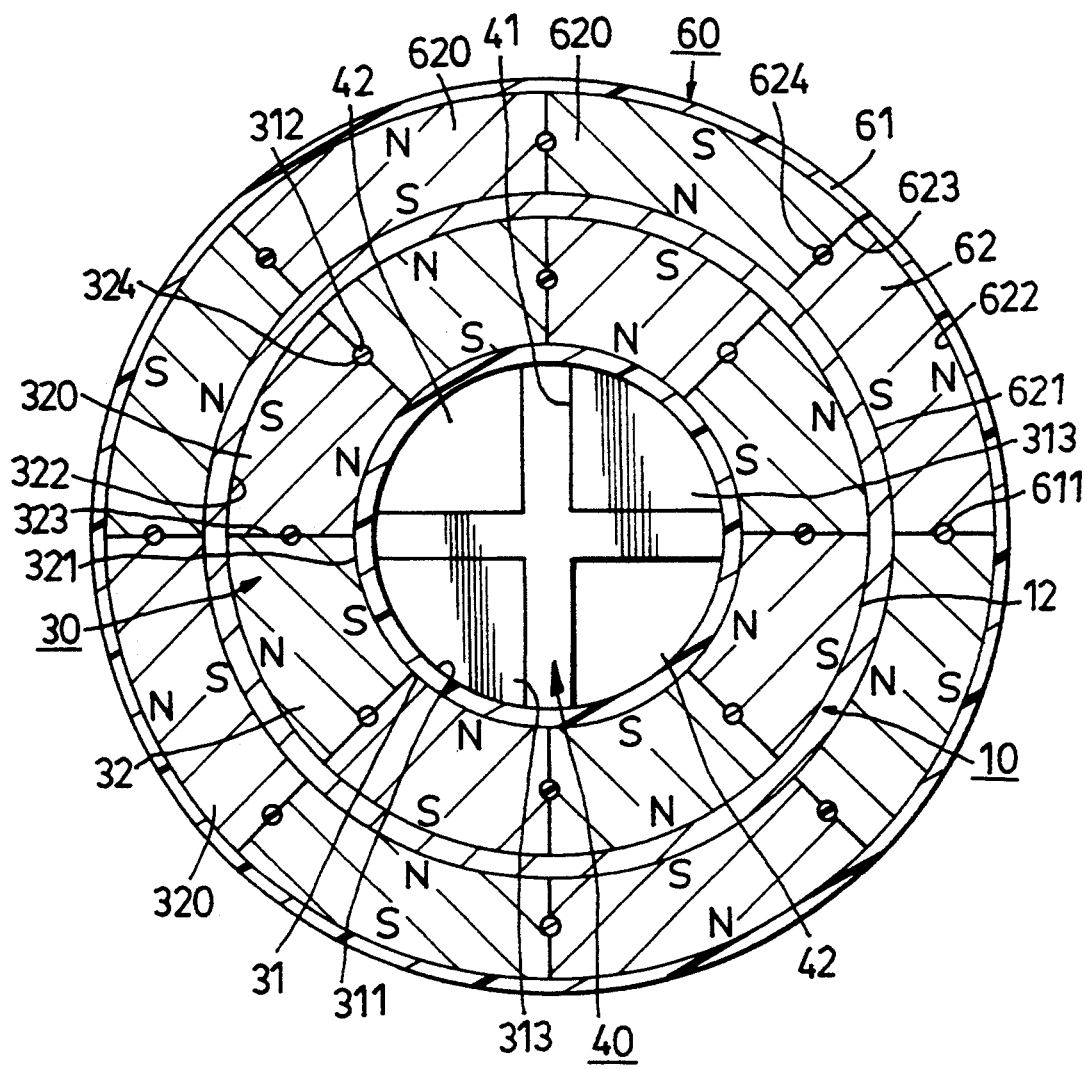
FIG. 5 is a sectional view taken along line V—V in FIG. 3 to illustrate the preferred embodiment when in a fully opened state.
Figure 6:
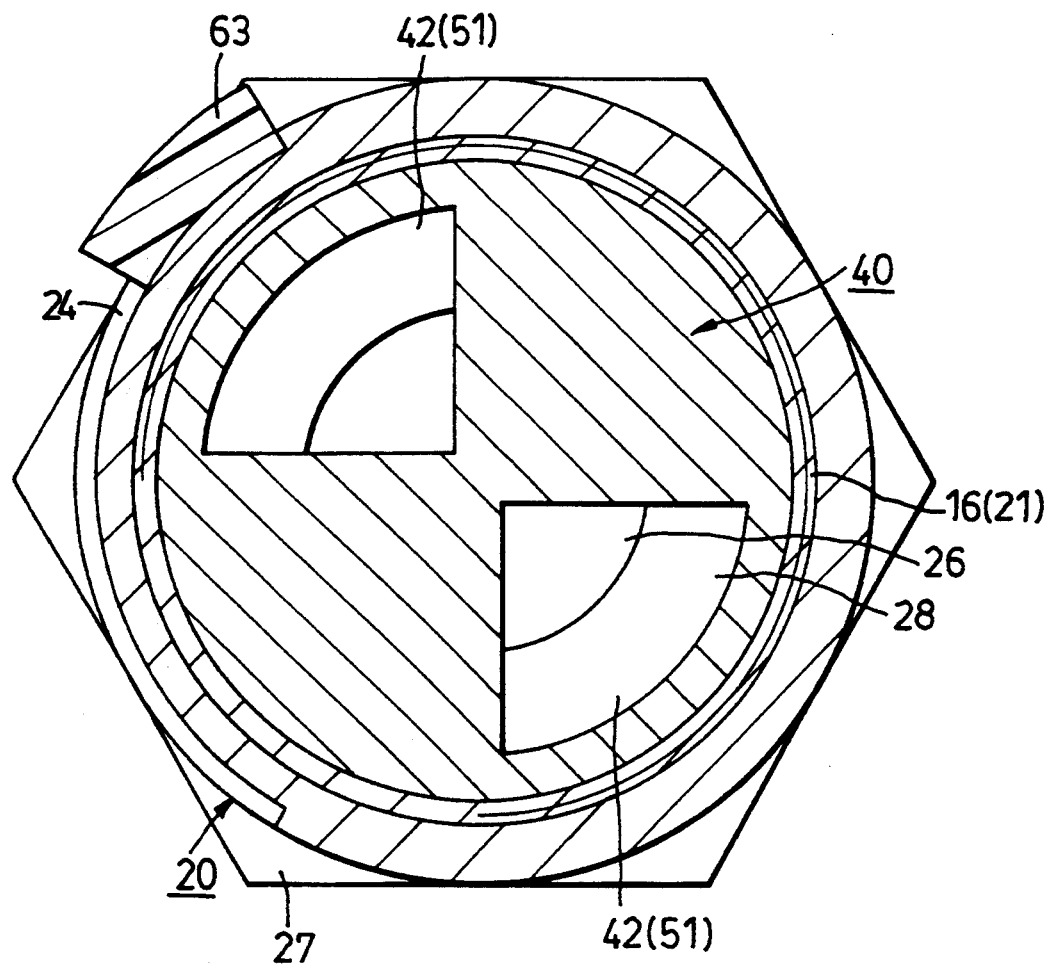
FIG. 6 is a sectional view taken along line VI—VI in FIG. 3.

Referring again to FIG. 2, in order to facilitate proper operation of the flow control valve of the present invention, the mounting tube 20 is provided with a triangular mark 291, 292 adjacent to each end of the limit groove 24. One of the words "ON" and "OFF" is printed adjacent to a respective one of the marks 291, 292. The limit projection 63 of the driving magnet ring 60 is also provided with a mark 631. When the mark 631 on the limit projection 63 is aligned with the mark 291, the sectoral openings 42 in the rotatable valve piece 40 are aligned with the fluid openings 51 in the stationary valve piece 50. The flow control valve permits the passage of fluid therethrough during such a condition, as shown in FIG. 5. When the mark 631 is aligned with the mark 292, the sectoral openings 42 in the rotatable valve piece 40 are 90° out of phase with the fluid openings 51 in the stationary valve piece 50. The flow control valve prevents the passage of fluid therethrough under such a condition, as shown in FIGS. 10 and 11.

Referring to FIGS. 3 to 6, when the flow control valve of the present invention is in an open state, fluid from the inlet tube 100 flows through the through-hole 311 of the driven magnet ring 31, the sectoral openings 42 in the rotatable valve piece 40, the fluid openings 51 in the stationary valve piece 50, and the central hole 26 and the passages 28 in the inward flange 221 of the mounting tube 20 in order to reach the outlet tube 200.

Figure 7:
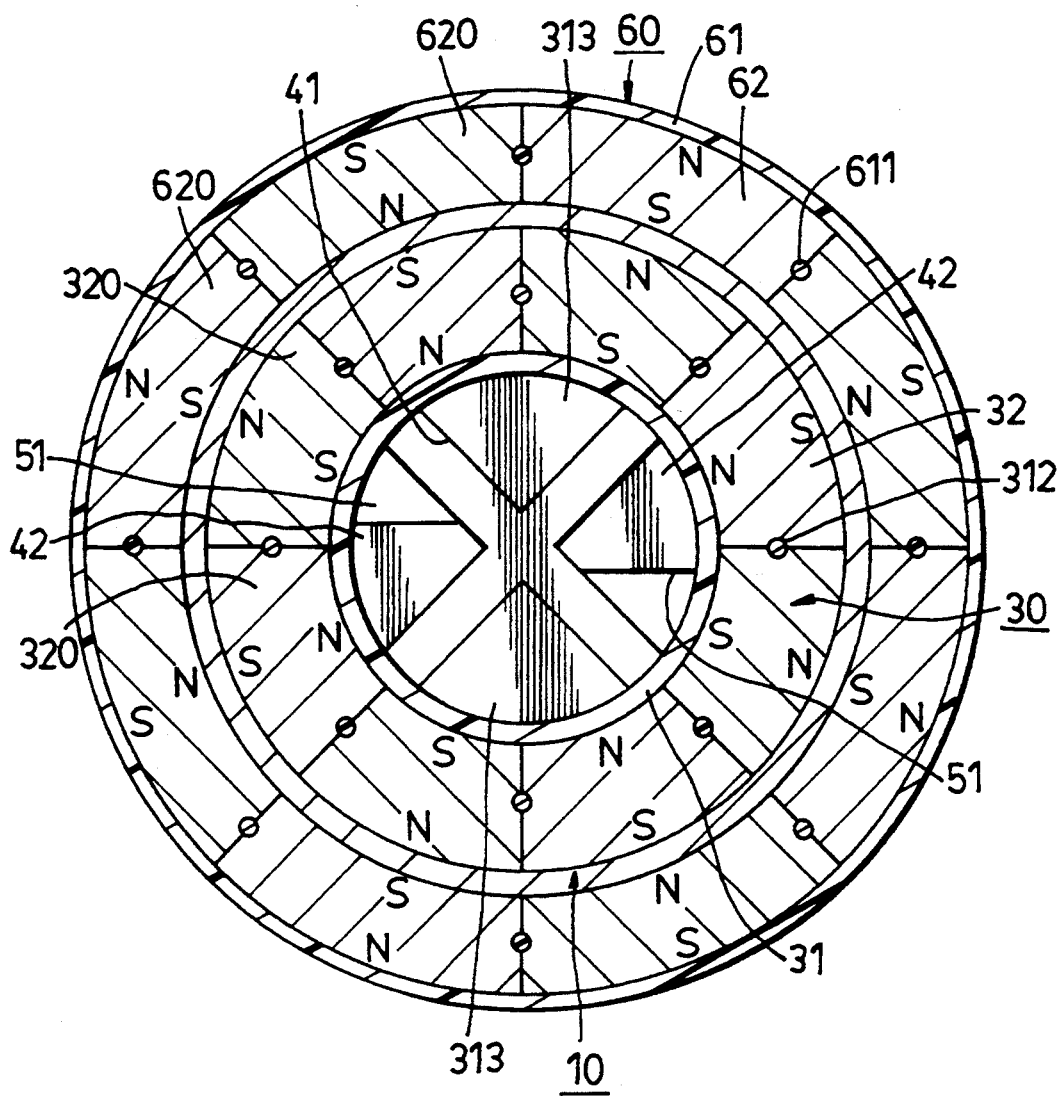
FIGS. 7 and 8 are sectional views which illustrate the preferred embodiment when in a partially open state.
Figure 8:
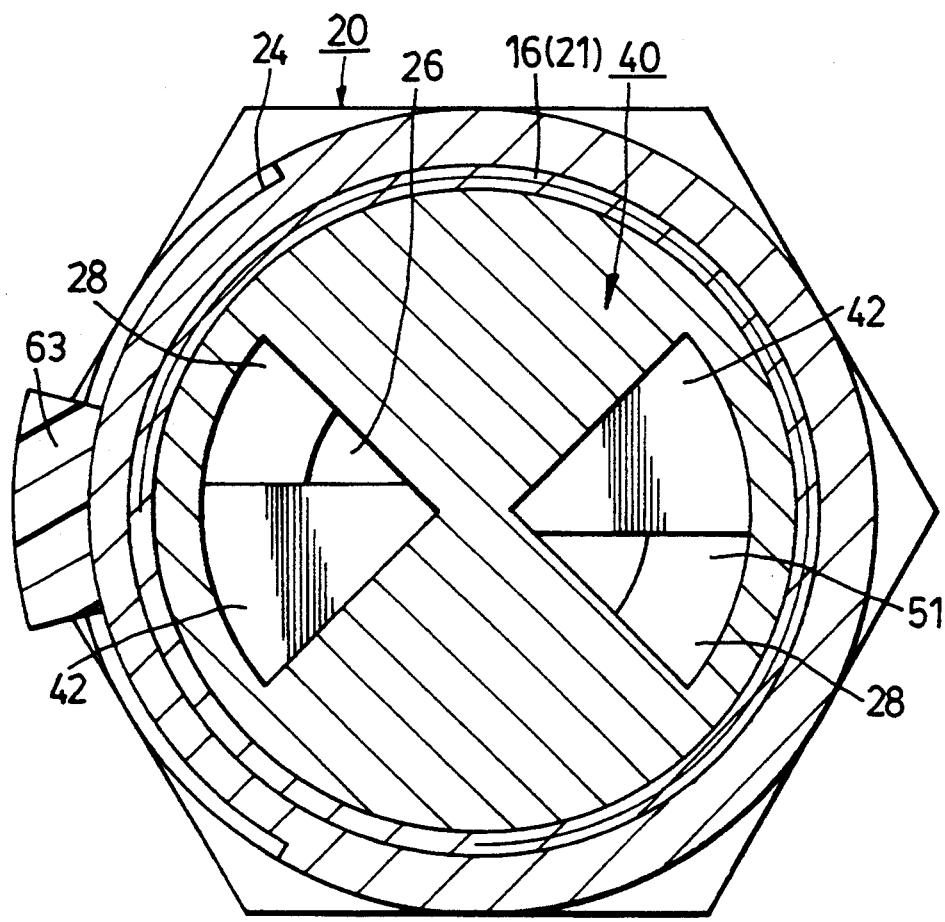

Referring to FIGS. 7 and 8, when the driving magnet ring 60 is rotated so as to move the limit projection 63 midway along the limit groove 24, the driven magnet ring 30 rotates therewith due to the presence of an attractive force between the magnet rings 30, 60. The rotatable valve piece 40 rotates with the driven magnet ring 30 such that the valve piece 40 covers slightly the openings 51 to limit the flow of fluid therethrough. Therefore, rotation of the driving magnet ring 60 can result in variations in the fluid flow through the flow control valve of the present invention. Moreover, only a small amount of applied force is needed to rotate the driving magnet ring 60 when varying the fluid flow through the flow control valve.

Figure 9:
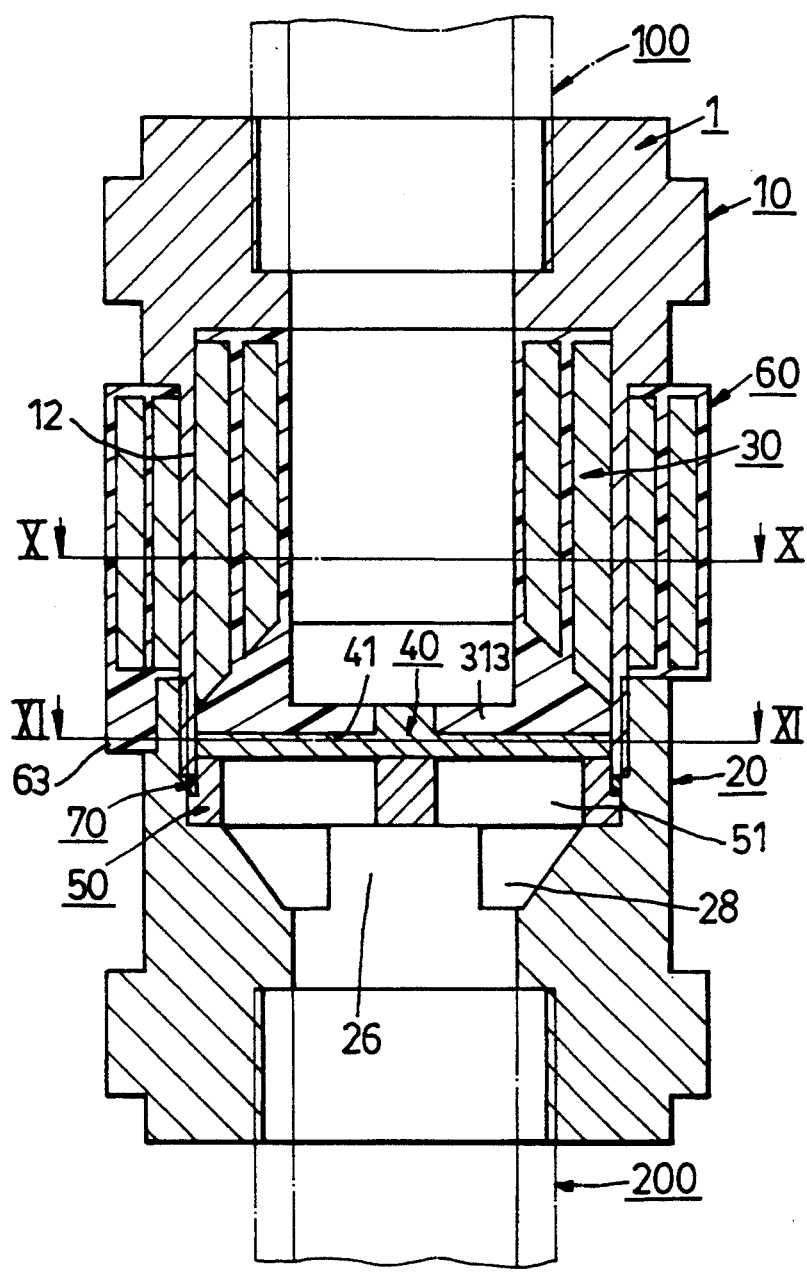
FIG. 9 is a sectional view which illustrates the preferred embodiment when in a fully closed state.
Figure 10:
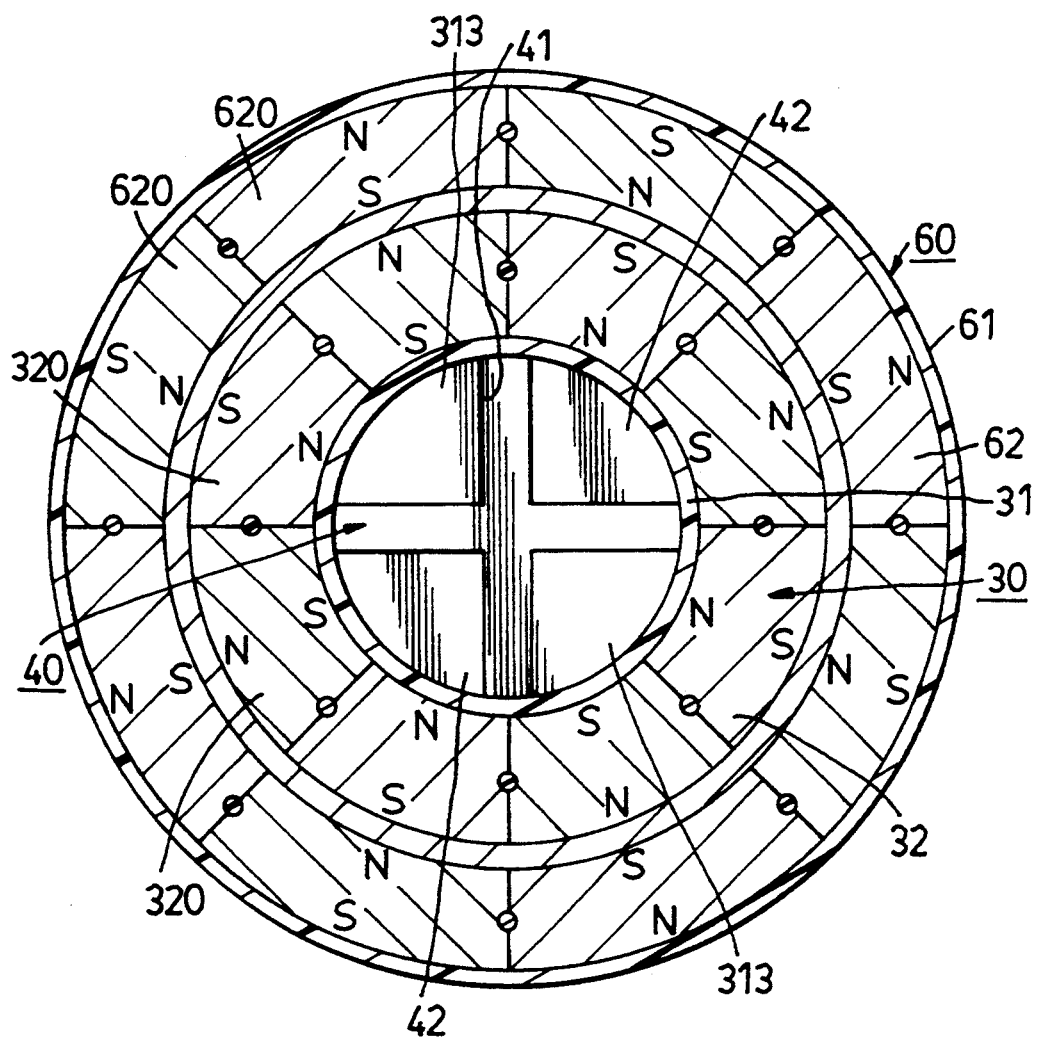
FIG. 10 is a sectional view of the preferred embodiment taken along line X—X in FIG. 9.
Figure 11:
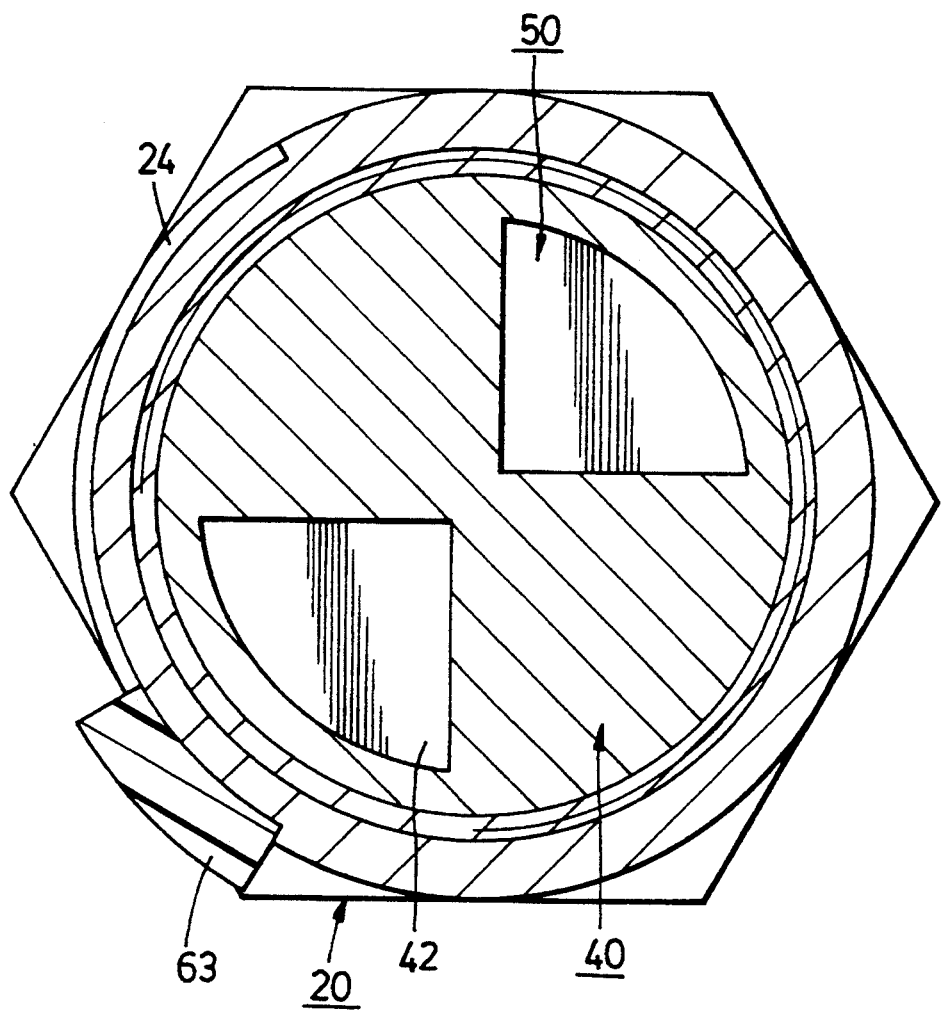
FIG. 11 is a sectional view of the preferred embodiment taken along line XI—XI in FIG. 9.

Referring to FIGS. 9, 10 and 11, when the mark 631 is aligned with the mark 292, the rotatable valve piece 40 covers completely the fluid openings 51 in the stationary valve piece 50, thereby preventing the flow of fluid to the outlet tube 200.

Note that the range of angular movement by the driving magnet ring 60 is limited by the width of the limit groove 24. Because the limit projection 63 has a 30° angular width, rotation of the driving magnet ring 60 is limited to 90°. This is sufficient to permit movement of the rotatable valve piece 40 between a first position, wherein the sectoral openings 42 in the rotatable valve piece 40 are aligned with the fluid openings 51 in the stationary valve piece 50, and a second position, wherein the rotatable valve piece 40 covers completely the fluid openings 51.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A magnetic control-type flow control valve, comprising:
    a metal tube unit with a top end portion, a bottom end portion and an intermediate portion between said top and bottom end portions, said intermediate portion having an outer wall surface that is formed with an annular recess;
    a driven magnet ring disposed rotatably in said intermediate portion of said metal tube unit, said driven magnet ring having a bottom end and an outer peripheral wall with a first polarity;
    a rotatable circular valve piece disposed in said intermediate portion of said metal tube unit and connected to said bottom end of said driven magnet ring, said rotatable valve piece having a bottom surface and being formed with a pair of diametrically opposite first openings;
    a stationary circular valve piece secured in said bottom end portion of said metal tube unit, said stationary valve piece having a top surface in tight contact with said bottom surface of said rotatable valve piece and being formed with a pair of diametrically opposite second openings; and
    a driving magnet ring sleeved on said outer wall surface of said intermediate portion of said metal tube unit in said annular recess, said driving magnet ring having an inner peripheral wall with a second polarity opposite to said first polarity, said driving magnet ring being rotatable to rotate said driven magnet ring therewith so as to rotate correspondingly said rotatable valve piece relative to said stationary valve piece between a first position, wherein said first and second openings are aligned, and a second position, wherein said rotatable valve piece covers completely said second openings.

2. The magnetic control-type flow control valve as claimed in claim 1, wherein said annular recess has a lower end and said metal tube unit is formed with a circumferentially extending limit groove of predetermined angular width adjacent to said lower end of said annular recess and communicated with said annular recess, said driving magnet ring having a limit projection which extends downwardly into said limit groove.

3. The magnetic control-type flow control valve as claimed in claim 1, wherein:
    said driven magnet ring comprises a first plastic shell and a first annular magnet unit with top and bottom walls, and inner and outer peripheral walls, said first plastic shell covering said top and bottom walls and said inner peripheral wall of said first annular magnet unit; and
    said driving magnet ring comprises a second plastic shell and a second annular magnet unit with top and bottom walls, and inner and outer peripheral walls, said second plastic shell covering said top and bottom walls and said outer peripheral wall of said second annular magnet unit.

4. The magnetic control-type flow control valve as claimed in claim 3, wherein said rotatable and stationary valve pieces are made of ceramic.

5. The magnetic control-type flow control valve as claimed in claim 3, wherein said first plastic shell has a bottom end which is formed with a pair of diametrically opposite insert projections that extend in a radial inward direction, and said rotatable valve piece has a top surface which is formed with a pair of diametrically opposite recesses to receive said insert projections therein.

6. The magnetic control-type flow control valve as claimed in claim 3, wherein each of said first and second annular magnet units includes an even number of axially extending magnet pieces.

7. The magnetic control-type flow control valve as claimed in claim 6, wherein each of said magnet pieces has a side wall which is adjacent to another one of said magnet pieces and which is formed with a longitudinally extending groove, and each of said first and second plastic shells has a plurality of mounting ribs which fill in said grooves of said magnet pieces.

* * * * *